United States Patent
Kuraoka et al.

(10) Patent No.: US 10,109,128 B2
(45) Date of Patent: Oct. 23, 2018

(54) ACCESS CONTROL SYSTEM TO INTERFERENCE AREA

(71) Applicant: KAWASAKI JUKOGYO KABUSHIKI KAISHA, Kobe-shi, Hyogo (JP)

(72) Inventors: Shuhei Kuraoka, Akashi (JP); Jun Takebayashi, Kakogawa (JP); Hideshi Yamane, Kakogawa (JP); Hiroyuki Mizumoto, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 0 days.

(21) Appl. No.: 15/577,966

(22) PCT Filed: May 29, 2015

(86) PCT No.: PCT/JP2015/002724
§ 371 (c)(1),
(2) Date: Nov. 29, 2017

(87) PCT Pub. No.: WO2016/194017
PCT Pub. Date: Dec. 8, 2016

(65) Prior Publication Data
US 2018/0151012 A1 May 31, 2018

(51) Int. Cl.
*B25J 19/06* (2006.01)
*G07C 9/00* (2006.01)
*G08B 5/36* (2006.01)

(52) U.S. Cl.
CPC .......... *G07C 9/00896* (2013.01); *B25J 19/06* (2013.01); *G07C 9/00126* (2013.01); *G08B 5/36* (2013.01)

(58) Field of Classification Search
CPC ......... G08B 5/36; G07C 9/00126; B25J 19/06
USPC ........................................................ 340/5.2
See application file for complete search history.

(56) References Cited

U.S. PATENT DOCUMENTS

2010/0127821 A1* 5/2010 Jones ................. G07C 9/00309
340/5.2
2014/0207285 A1* 7/2014 Sakabe .................. B25J 9/1697
700/259

FOREIGN PATENT DOCUMENTS

JP 2014-140920 A 8/2014

OTHER PUBLICATIONS

Aug. 11, 2015 International Search Report issued in International Patent Application No. PCT/JP2015/002724.
Aug. 11, 2015 Written Opinion issued in International Patent Application No. PCT/JP2015/002724.

\* cited by examiner

*Primary Examiner* — Qutbuddin Ghulamali
(74) *Attorney, Agent, or Firm* — Oliff PLC

(57) ABSTRACT

An access control system configured to manage access of a worker to an interference area that the worker and a robot share, includes the indicating lamps which are disposed at least in four directions from a center of the interference area, a door which opens and closes a gate of the interference area, a lock device which locks and unlocks the door, and a control device which controls the indicating lamps and the lock device corresponding to the operation of the robot.

8 Claims, 5 Drawing Sheets

| OPERATING STATE | ROBOT INDICATING LAMP | GATE INDICATING LAMP | LOCK DEVICE |
|---|---|---|---|
| ROBOTS IS STOPPED | BLUE LIGHTING | BLUE LIGHTING | UNLOCK |
| ROBOT IS EXECUTING PROGRAM WHICH INCLUDES WORK IN INTERFERENCE AREA | RED LIGHTING | RED LIGHTING | LOCK |
| ROBOT IS EXECUTING PROGRAM WHICH DOES NOT INCLUDE WORK IN INTERFERENCE AREA | RED BLINKING | BLUE LIGHTING | UNLOCK |

| OPERATING STATE | ROBOT INDICATING LAMP | GATE INDICATING LAMP | LOCK DEVICE |
|---|---|---|---|
| ALL ROBOTS ARE STOPPED | BLUE LIGHTING | BLUE LIGHTING | UNLOCK |
| AT LEAST ONE ROBOT IS EXECUTING PROGRAM WHICH INCLUDES WORK IN INTERFERENCE AREA | RED LIGHTING | RED LIGHTING | LOCK |
| ALL ROBOTS ARE EXECUTING PROGRAM WHICH DOES NOT INCLUDE WORK IN INTERFERENCE AREA | RED BLINKING | BLUE LIGHTING | UNLOCK |

FIG. 7

ACCESS CONTROL SYSTEM TO INTERFERENCE AREA

TECHNICAL FIELD

The present disclosure relates to a system which manages an access of a worker to a workspace (hereinafter, referred to as "the interference area") where the worker and an industrial robot share.

BACKGROUND ART

Conventionally, an operating area of an industrial robot is enclosed by a safety fence, and the safety fence separates a worker from the industrial robot. In recent years, because of an improvement of industrial robots in control capabilities, sharing of the workspace between the worker and the industrial robot is able to be theoretically realized. However, if the industrial robot is enclosed by the safety fence, the worker cannot easily access to the interference area.

On the other hand, without providing the conventional safety fence, a system which avoids interference between the industrial robot and the worker is proposed by monitoring that the worker and objects enter into an area around the industrial robot. For example, a system disclosed in Patent Document 1 includes a sensor part which monitors an entry of an unregistered new object into an operating area of a robot, a visible light irradiating part which irradiates visible light to a perimeter part of the operating area from a position higher than the robot, and a monitoring controller which issues a stop demand to the robot when the sensor part determines that there is an entry of the new object into the operating area. The irradiation of visible light may be performed only when there is an entry of the new object into a surveillance area which includes the operating area. In this system, a situation where the worker enters into the operating area to stop the robot is reduced without installing the safety fence around the robot, by attracting the worker's attention to the robot operating area with the visible light.

REFERENCE DOCUMENT OF CONVENTIONAL ART

Patent Document

[Patent Document 1] JP2014-140920A

DESCRIPTION OF THE DISCLOSURE

Problems to be Solved by the Disclosure

According to the system disclosed in Patent Document 1, the substantive fence can be removed from the perimeter of the industrial robot. However, if the technology of Patent Document 1 is applied to the system in which the worker and the robot share the workspace, there are some problems that it is difficult for the worker to recognize the interference area and to determine whether it is in a situation where the worker is able to work in the interference area.

The present disclosure is made in view of the above situations, and the purpose thereof is to reduce at least one or more of the problems of the conventional arts.

SUMMARY OF THE DISCLOSURE

According to one aspect of this disclosure, an access control system is provided which manages access of a worker to an interference area that is a workspace that the worker and a robot share. The system includes a plurality of indicating lamps defining a boundary between the interference area and another area, an opening-and-closing member configured to open and close a gate of the interference area, a lock device configured to lock and unlock the opening-and-closing member, and a control device configured to control the plurality of indicating lamps and the lock device corresponding to operation of the robot.

According to the access control system to the interference area, the boundary between the interference area and other area is indicated to the worker by light-emitting parts of the indicating lamps and/or the light emitted therefrom so that the interference area can be recognized by the worker based on the boundary. Moreover, since in the access control system to the interference area, the indication mode of the indicating lamp and the locking or unlocking of the opening-and-closing member are controlled corresponding to the operation of the robot, the worker can easily determine based on these situations whether the worker is able to work in the interference area so that interference between the robot and the worker in the interference area is avoided.

Effect of the Disclosure

According to the present disclosure, the worker can recognize the interference area and can determine whether it is in the situation where the worker is able to work in the interference area.

BRIEF DESCRIPTION OF THE DRAWINGS

FIG. 7 is a table illustrating operation of an access control system to an interference area corresponding to the robot system according to Modification 2.

MODES FOR CARRYING OUT THE DISCLOSURE

Next, embodiments of the present disclosure will be described with reference to the accompanying drawings. First, a schematic structure of a robot system to which an access control system to an interference area according to the present disclosure is applied is described.

Robot System 1

Figure 1:
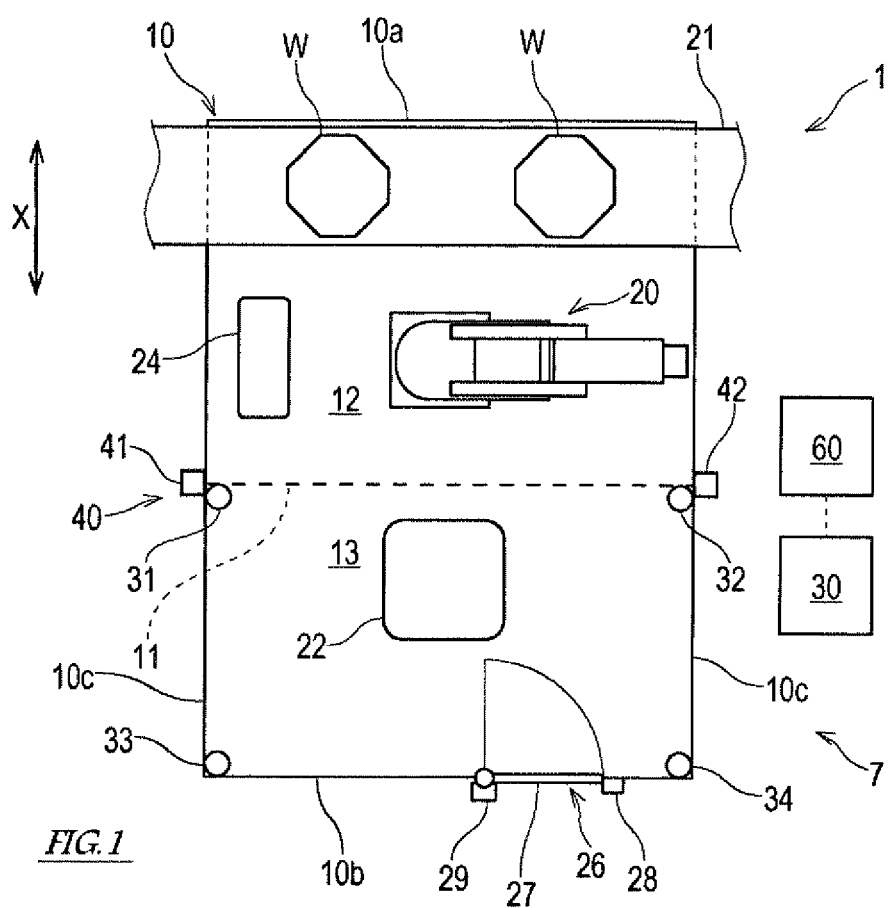
FIG. 1 is a plan view illustrating a schematic structure of a robot system to which an access control system to an interference area according to one embodiment of the present disclosure is applied.
Figure 2:
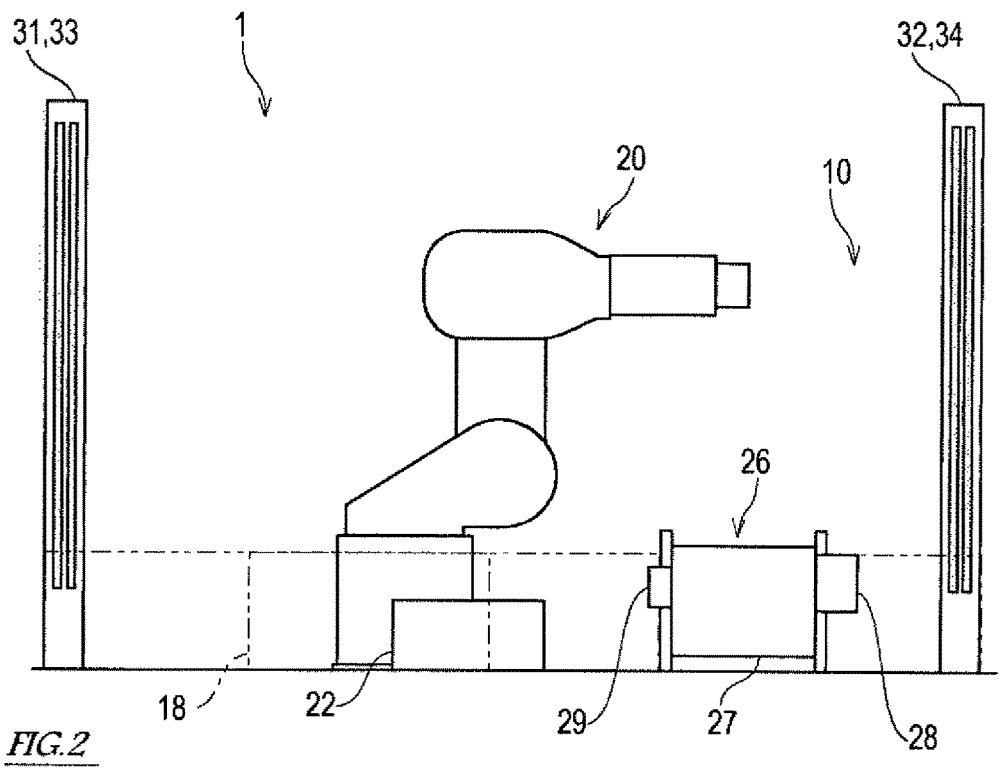
FIG. 2 is a side view of the robot system seen in a first direction X illustrated in FIG. 1.

FIG. 1 is a plan view illustrating a schematic structure of a robot system 1 to which an access control system 7 to the interference area according to one embodiment of the present disclosure is applied, and FIG. 2 is a side view of the robot system 1 seen in a first direction X illustrated in FIG. 1. As illustrated in FIGS. 1 and 2, the robot system 1 is established in a system area 10. The system area 10 according to this embodiment has a contour of a rectangular parallelepiped shape, and is virtually divided into two three-dimensional areas disposed adjacently in the horizontal first directions X by a virtual boundary 11 (border plane) illustrated by a dashed line in FIG. 1. Note that, although it is not necessary to install a substantive fence at the boundary 11, a low fence or marker having such a height that it does not interfere with a robot 20 may be installed.

One of the two three-dimensional areas is a workspace where the robot 20 works exclusively, and below, it is referred to as "the robot area 12." The other of the two three-dimensional areas is a workspace which the robot 20 and the worker share, and below, it is referred to as "the interference area 13." In the interference area 13, the robot 20 and the worker work alternately.

A conveyor 21 which conveys workpieces W is installed along an end surface 10*a* on the robot area 12 side among virtual end surfaces of the system area 10 in the first directions X. Moreover, a gate 26 which is an entrance and exit of the worker to/from the interference area 13 is provided to an end surface 10*b* on the interference area 13 side among the virtual end surfaces of the system area 10 in the first directions X. A door 27 (one example of an opening-and-closing member) which opens and closes the gate 26 is provided to the gate 26. Note that, an easily-removable temporary fence (a two-dot chain line 18 of FIG. 2) may be provided at the virtual end surface 10*b* of the system area 10 where the gate 26 is provided, so that the worker does not enter into the interference area 13 from other than the gate 26. Similarly, an easily-removable temporary fence (not illustrated) may also be provided at virtual end surfaces 10*c* of the interference area 13, and the virtual end surfaces 10*c* are horizontal perpendicular to the first directions X.

The robot 20, the conveyor 21 which conveys the workpieces W, a tool table 24 where tools to be attached to a hand of the robot 20 are placed, etc. are installed on a floor surface of the robot area 12. Moreover, a work bench 22 where the workpiece W is placed is installed on a floor surface of the interference area 13.

The robot 20 according to this embodiment is an industrial articulated robot having a plurality of joint shafts. The robot 20 is connected with a robot control device 60 via cables (not illustrated). The robot control device 60 is configured as a computer provided with a CPU and a memory. The robot control device 60 stores beforehand a plurality of operating programs. The robot control device 60 selectively executes one or more of the plurality of operating programs and drives a servo motor provided to each joint of the robot 20 to control operation of the robot 20. Some or all of the interference area 13 are included in an operable range of the robot 20 (a range within which each part of the robot 20 may be located).

In the robot system 1, a series of works can be carried out, for example, the robot 20 carries the workpiece W from the conveyor 21 to the work bench 22, the worker temporarily tightens bolt(s) to the workpiece W on the work bench 22, the robot 20 carries out a final tightening of the bolt(s), and the robot 20 then carries the workpiece W from the work bench 22 to the conveyor 21. In such a series of works, the robot 20 and the worker share the interference area 13 as their workspace. Thus, there is an advantage that an occupancy space of the robot 20 is reducible by sharing the workspace between the worker and the robot 20.

In order to avoid interference between the robot 20 and the worker in the interference area 13, the access control system 7 which manages access of the worker to the interference area 13 is provided to the robot system 1. Below, the access control system 7 to the interference area 13 is described in detail.

Access Control System 7 to Interference Area 13

Figure 3:
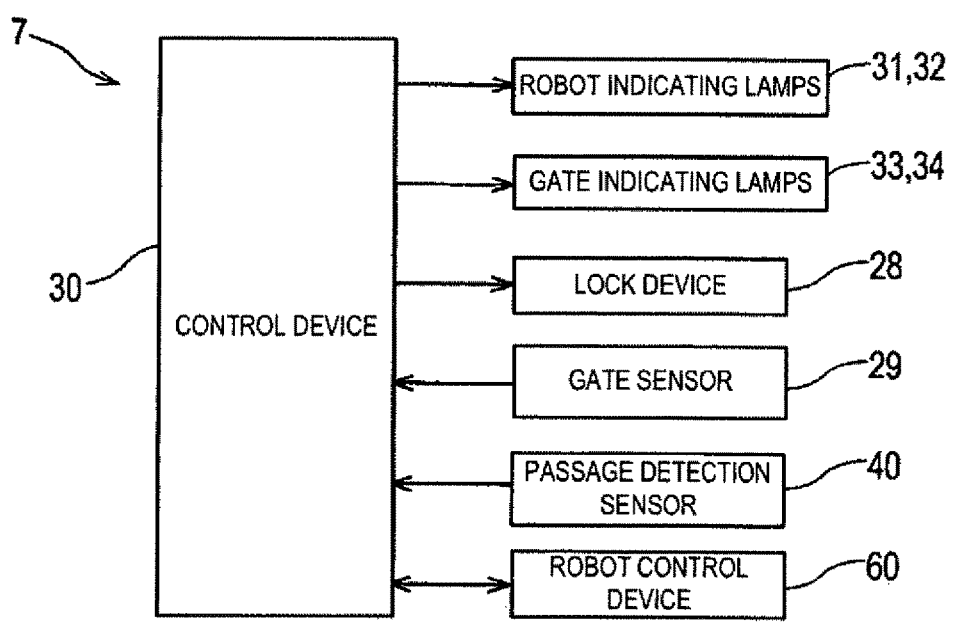
FIG. 3 is a view illustrating a configuration of a control system of the access control system to the interference area.

FIG. 3 is a view illustrating a configuration of a control system of the access control system 7 to the interference area 13. As illustrated in FIGS. 1-3, the access control system 7 to the interference area 13 includes a plurality of indicating lamps 31-34, a passage detection sensor 40 which contactlessly detects that an unexpected object passes through the boundary 11, and an electromagnetic lock device 28 which is capable of locking and unlocking the door 27, a gate sensor 29 which detects opening and closing of the door 27, and a control device 30. Note that the object passing through the boundary 11 includes part of the object passing through the boundary 11.

The plurality of indicating lamps 31-34 are disposed so that they are capable of defining, by light-emitting parts (light sources) and/or light emitted therefrom, a boundary between the interference area 13 and other areas. The plurality of indicating lamps 31-34 according to this embodiment are disposed so that the worker can imagine a line (or a surface) which connects the light-emitting parts of the adjacent indicating lamps, and he/she can recognize the line as the boundary. For example, the plurality of indicating lamps 31-34 may be disposed at least in four directions when seen from the worker who is located at the center of the interference area 13.

The plurality of indicating lamps 31-34 according to this embodiment include a pair of indicating lamps 31 and 32 disposed along the boundary 11 between the areas of the interference area 13 and the robot area 12, and a pair of indicating lamps 33 and 34 disposed along the virtual end surface 10*b* of the system area 10 at which the gate 26 is provided. The former pair of indicating lamps 31 and 32 define a boundary between the interference area 13 and the robot area 12 which is a straight line in a plan view, and below, they may be referred to as "the robot indicating lamps 31 and 32." Note that the robot indicating lamps are not limited to the structure of this embodiment as long as at least one indicating lamp which defines at least part of the boundary 11 between the robot area 12 and the interference area 13 is provided.

The robot indicating lamps 31 and 32 are provided in order for the worker to recognize the interference area 13 and/or the boundary 11 between the interference area 13 and the robot area 12, and to be informed with a situation of the robot 20 (operating or stopped). The robot indicating lamps 31 and 32 are located on the robot 20 side when seen from the worker who is located at the center of the interference area 13. Further, the robot indicating lamps 31 and 32 are located on the robot 20 side when seen from the worker who is located on the boundary between the interference area 13 and other areas of the system area 10.

Moreover, these four indicating lamps 31-34 define a substantially U-shaped boundary between the interference area 13 and areas other than the robot area 12 in the plan view. Below, the pair of indicating lamps 33 and 34 which define one side including the gate 26 among the substantially U-shaped boundary in the plan view may be referred to as "the gate indicating lamps 33 and 34." Note that the gate indicating lamps are not limited to this embodiment as long as at least one indicating lamp which defines at least part of the boundary between the interference area 13 and areas other than the robot area 12 which includes the gate 26 is provided.

The gate indicating lamps 33 and 34 are provided in order for the worker to recognize the interference area 13 and to be informed with an accessibility of the worker to the interference area 13. The gate indicating lamps 33 and 34 are located on the gate 26 side when seen from the center of the interference area 13.

Each of the indicating lamps 31-34 includes two kinds of light-emitting parts extending in vertical directions. Each light-emitting part is desirable to extend in the vertical directions at least within a range which is visible by the worker both when he/she takes a bending posture and a standing-up posture. The two kinds of light-emitting parts according to this embodiment are a blue light-emitting part and a red light-emitting part. The two kinds of light-emitting parts may be comprised of, for example, red light-emitting diodes continuously arrayed in the vertical directions and blue light-emitting diodes continuously arrayed in the vertical directions, or red light-emitting diodes and blue light-emitting diodes arrayed alternately in the vertical directions. Alternatively, the two kinds of light-emitting parts may be comprised of at least one type of light-emitting devices, such as a fluorescent light, other than light-emitting diodes.

The passage detection sensor 40 according to this embodiment is a so-called "light curtain." The passage detection sensor 40 is comprised of a floodlight unit 41 and a photodetector unit 42. The floodlight unit 41 has a plurality of floodlights which emit a plurality of parallel rays of light to the photodetector unit 42. The floodlight unit 41 and the photodetector unit 42 are installed in the system area 10 so that the plurality of parallel rays of light form the boundary 11. The photodetector unit 42 has a plurality of photodetectors which receive the plurality of parallel rays of light emitted from the floodlight unit 41, respectively. The photodetector unit 42 detects that an object exists in a detection field of the passage detection sensor 40 (i.e., optical paths of the plurality of parallel rays of light) based on whether or not the plurality of photodetectors receive the rays of light. Note that, as for the passage detection sensor 40, a passage detection sensor of other forms which contactlessly detects the object existing at the boundary 11 may be used instead of the light curtain.

The indicating lamps 31-34, the passage detection sensor 40, the robot control device 60, the gate sensor 29, the lock device 28, etc. are connected with the control device 30 in a wired or wireless manner. The control device 30 is configured as a computer provided with a CPU and a memory, and controls on/off of the indicating lamps 31-34, and operations of the lock device 28 and the robot 20, based on information received from the gate sensor 29, the passage detection sensor 40, and the robot control device 60. Note that the control device 30 and the robot control device 60 do not need to be physically separated, but, for example, functions of these devices may be implemented as a plurality of functional parts which exist in one program.

Figures 4, 5:
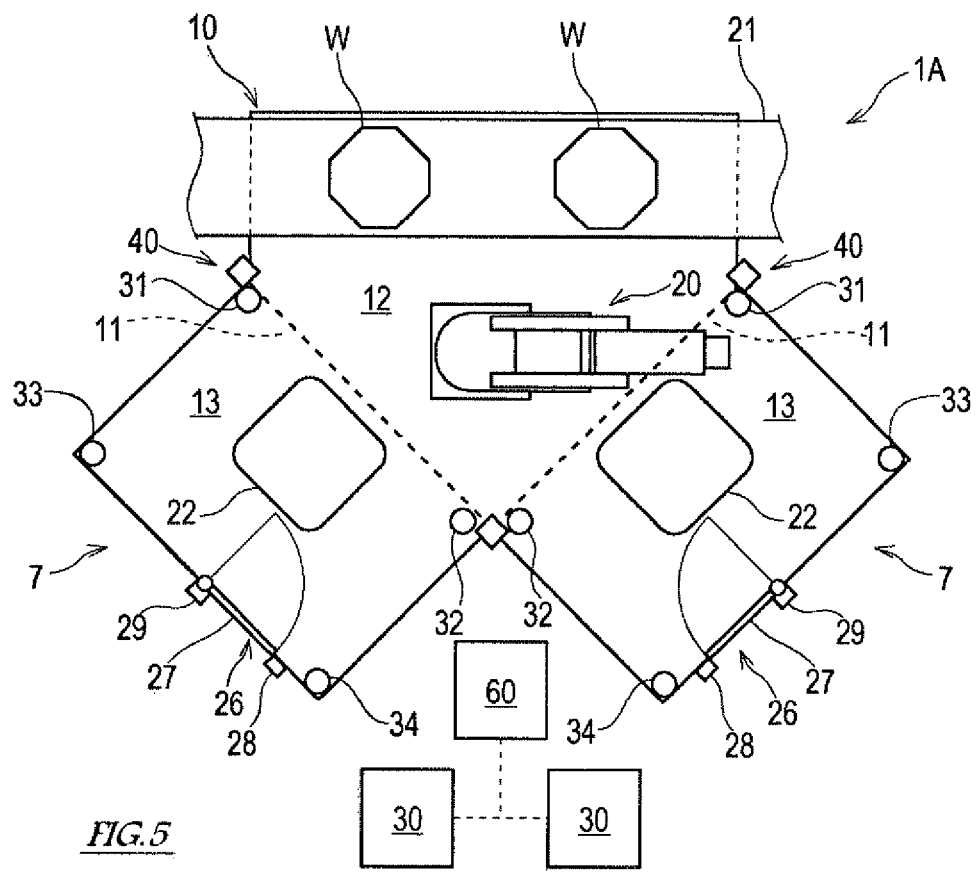
FIG. 4 is a table illustrating operation of the access control system to the interference area.
FIG. 5 is a plan view illustrating a schematic structure of a robot system according to Modification 1.

Here, operation of the access control system 7 is described using FIG. 4. FIG. 4 is a table illustrating the operation of the access control system 7 to the interference area 13.

In the access control system 7, the boundary between the interference area 13 and other areas is indicated by turning on all the indicating lamps 31-34. In this embodiment, the perimeter (four corners) of the interference area 13 is illuminated by the indicating lamps 31-34. Thus, the interference area 13 can clearly be recognized by the worker. In each of the indicating lamps 31-34, in principle, lighting of the red light-emitting part illustrates and/or informs "prohibited," blinking of the red light-emitting part "caution," and lighting of the blue light-emitting part "permitted."

When the robot 20 is stopped (i.e., when the robot 20 is in a state where it is impossible to operate, such as when a motor power source of the robot 20 is off), a worker's entry into the interference area 13 is permitted. Thus, when the robot 20 is stopped, the control device 30 of the access control system 7 turns on the blue light-emitting parts of all the indicating lamps 31-34 and causes the lock device 28 to unlock the door 27. Therefore, the worker can open the door 27 and access to the interference area 13.

When the robot 20 is performing a work in the interference area 13, or a work spanning across the interference area 13 and the robot area 12, a worker's entry into the interference area 13 is forbidden or prohibited. Thus, when the robot 20 is executing the operating program including the work in the interference area 13, the control device 30 of the access control system 7 turns on the red light-emitting parts of all the indicating lamps 31-34 and causes the lock device 28 to lock the door 27. Therefore, the worker cannot open the door 27 and cannot enter into the interference area 13. Note that the work of the robot 20 in the interference area 13 includes the work of at least part of the workpiece W held by the robot 20 entering into the interference area 13.

When the robot 20 is performing the work in the robot area 12, a worker's entry into the interference area 13 is permitted while nudging (or attracting attention of) the worker. Thus, when the robot 20 is executing the operating program which does not include the work in the interference area 13, the control device 30 of the access control system 7 causes the red light-emitting parts of the robot indicating lamps 31 and 32 to blink, turns on the blue light-emitting parts of the gate indicating lamps 33 and 34, and causes the lock device 28 to unlock the door 27. Therefore, the worker can open the door 27 and access to the interference area 13. The worker entered into the interference area 13 can know by visually observing the blinking of the red light-emitting parts of the robot indicating lamps 31 and 32 that the robot 20 is operating or is going to operate in the robot area 12.

Note that, while the worker exists in the interference area 13, the door 27 remains opened. Thus, while the worker exists in the interference area 13, the gate sensor 29 detects an open of the gate 26. While the open of the gate 26 is detected, the control device 30 sends a signal indicative of prohibiting an entry into the interference area 13 to the robot control device 60 so that the robot 20 does not enter into the interference area 13. Moreover, while the open of the gate 26 is detected, the control device 30 may send a low-speed operating signal to the robot control device 60 so as to cause the robot 20 to operate at a speed lower than normal.

Furthermore, when the passage detection sensor 40 detects an object which passes through the boundary 11 while the open of the gate 26 is detected, the control device 30 sends a stop signal to the robot control device 60 so that the robot 20 is stopped. Therefore, the robot 20 can be stopped when the worker crosses the boundary 11 and enters into the robot area 12.

As described above, the access control system 7 to the interference area 13 of this embodiment is a system which manages the access of the worker to the interference area 13 which is the workspace where the worker and the robot 20 share. The access control system 7 includes the plurality of indicating lamps 31-34 which define the boundary between the interference area 13 and other areas, the door 27 (opening-and-closing member) which opens and closes the gate 26 of the interference area 13, the lock device 28 which locks and unlocks the door 27, and the control device 30 which controls the indicating lamps 31-34 and the lock device 28 corresponding to the operation of the robot 20.

According to the access control system 7, the boundary between the interference area 13 and other areas is indicated to the worker by the light-emitting parts of the indicating lamps 31-34 and/or the light emitted therefrom so that the interference area 13 can be recognized by the worker based on the boundary. Moreover, since in the access control system 7 the indication mode of the indicating lamp 31, and the locking or unlocking of the door 27 is controlled corresponding to the operation of the robot 20, the worker can easily determine based on these situations whether the worker is able to work in the interference area 13 so that interference between the robot 20 and the worker in the interference area 13 can be avoided.

Moreover, according to the access control system 7, the space can be divided into the interference area 13 and other areas by the indicating lamps 31-34, without providing a substance (actual object) at the boundary between the interference area 13 and other areas. Therefore, as compared with a case where the system 1 is provided with a substantive fence, dead spaces are reduced, a complicated procedure is reduced upon the worker accessing the interference area 13, and a restriction of the size of the object when carrying the object into/out the interference area 13 is eased.

Moreover, in the access control system 7 to the interference area 13 of this embodiment, when the robot 20 is executing the operating program including the work in the interference area 13, the control device 30 causes the indicating lamps 31-34 to indicate "prohibited" (i.e., turns on the red light-emitting parts), and controls the indicating lamps 31-34 and the lock device 28 to cause the lock device 28 to lock the door 27.

Thus, when the robot 20 is performing the work in the interference area 13, since the indicating lamp 31 is indicating "prohibited" and the door 27 is locked, the worker cannot access to the interference area 13. Therefore, the worker can easily determine that it is in the situation where the worker cannot work in the interference area 13. As a result, interference between the robot 20 and the worker in the interference area 13 is avoided.

Moreover, in the access control system 7 to the interference area 13 of this embodiment, the plurality of indicating lamps 31-34 include at least one robot indicating lamps (31 and 32) which define at least part of the boundary between the robot area 12 which is the workspace where the robot 20 works exclusively and the interference area 13, and at least one gate indicating lamps (33 and 34) which define at least part of the boundary between the interference area 13 and areas other than the robot area 12, which includes the gate 26 of the boundary. When the robot 20 is executing the operating program which does not include the work in the interference area 13, the control device 30 controls the indicating lamps 31-34 and the lock device 28 to cause the robot indicating lamps 31 and 32 to indicate "nudging" (i.e., to cause the red light-emitting parts to blink), cause the gate indicating lamps 33 and 34 to indicate "permitted" (i.e., to turn on the blue light-emitting parts), and cause the lock device 28 to unlock the door 27.

Therefore, when the robot 20 is performing the work only in the robot area 12, since the indicating lamps 33 and 34 are indicating "permitted" and the door 27 is unlocked, the worker can access to the interference area 13. Then, when the worker enters into the interference area 13, he/she can visually recognize the indicating lamps 31 and 32 indicating "nudging." Therefore, the worker can easily determine that it is in the situation where he/she is able to work in the interference area 13 but needs to be cautious.

Moreover, in the access control system 7 to the interference area 13 of this embodiment, when the robot 20 is stopped, the control device 30 controls the indicating lamps 31-34 and the lock device 28 to cause the indicating lamps 31-34 to indicate "permitted" (i.e., to turn on the blue light-emitting parts) and to cause the lock device 28 to unlock the door 27.

Therefore, when the robot 20 is stopped (i.e., when the robot 20 is in a state where it is impossible to operate, such as when a motor power source of the robot 20 is off), since the indicating lamps 31-34 are indicating "permitted" and the door 27 is unlocked, the worker can access to the interference area 13. Therefore, the worker can easily determine that it is in the situation where the worker is able to work in the interference area 13.

Moreover, the access control system 7 to the interference area 13 of this embodiment further includes the gate sensor 29 which detects opening and closing of the gate 26. In addition, the control device 30 is configured to detect that the worker exists in the interference area 13 based on the open of the gate 26 detected by the gate sensor 29.

Therefore, it is detectable by a comparatively simple configuration whether the worker exists in the interference area 13.

Moreover, in the access control system 7 to the interference area 13 of this embodiment, the robot area 12 of the robot 20 is defined adjacent the interference area 13, and the access control system 7 further includes the passage detection sensor 40 which detects that the object exists at the boundary 11 between the interference area 13 and the robot area 12. In addition, the control device 30 is configured, when the worker exists in the interference area 13, to transmit the stop signal to the robot 20 (the robot control device 60) when the passage detection sensor 40 detects that the object exists at the boundary 11.

Thus, while the worker is working in the interference area 13, the robot 20 stops its operation when the worker enters into the robot area 12. Moreover, while the worker is working in the interference area 13, the robot 20 stops its operation when the robot 20 or the workpiece W held by the robot 20 enters into the interference area 13. Therefore, interference of the robot 20 and the worker is avoidable.

Although the suitable embodiment of the present disclosure is described above, the configuration described above can be changed as follows, for example.

In the embodiment described above, although each one of the indicating lamps 31-34 is disposed in respective four directions of the interference area 13, one or more additional indicating lamps may be disposed so as to surround the interference area 13. Furthermore, in addition to the indicating lamps, in order to be easily visible by the worker who works in the bending posture, additional indicating lamp(s) which is turned on synchronizing with the robot indicating lamps 31 and 32 may be provided on the floor surface of the interference area 13, to the work bench 22, etc.

In the embodiment described above, although the "prohibited" indication of the indicating lamps 31-34 is defined as the lighting of the red light-emitting parts, the "nudging" indication as the blinking of the red light-emitting parts, and the "permitted" indication as the lighting of the blue light-emitting parts, the indication method of the indicating lamps 31-34 is not limited thereto. That is, as long as the worker can recognize it as the situation of the interference area 13 and the robot 20 (operating or stopped), the modes of the "prohibited" indication, "nudging" indication, and "permitted" indication of the indicating lamps 31-34 are not limited. For example, the indicating lamps 31-34 may be provided with orange light-emitting parts instead of the red light-emitting parts, and green light-emitting parts instead of the blue light-emitting parts, and the "prohibited" indication may be defined as lighting of the orange light-emitting parts, the "nudging" indication as blinking of the orange light-emitting parts, and the "permitted" indication as lighting of the green light-emitting parts. Moreover, for example, the indicating lamps 31-34 may be further provided with yellow light-emitting parts, and the "nudging" indication may be defined as lighting of the yellow light-emitting parts. Moreover, for example, in addition to the indicating lamps 31-34, the access control system 7 may be provided with an alarm which issues audio or buzzer sound, and the alarm may also inform the situation of the robot 20 to the worker.

In the embodiment described above, although one interference area 13 is defined per robot 20, two or more interference areas 13 may be defined per robot 20 similar to a robot system 1A according to Modification 1 illustrated in FIG. 5, for example. In such a case, it is desirable to establish the access control system 7 for each interference area 13.

Figure 6:
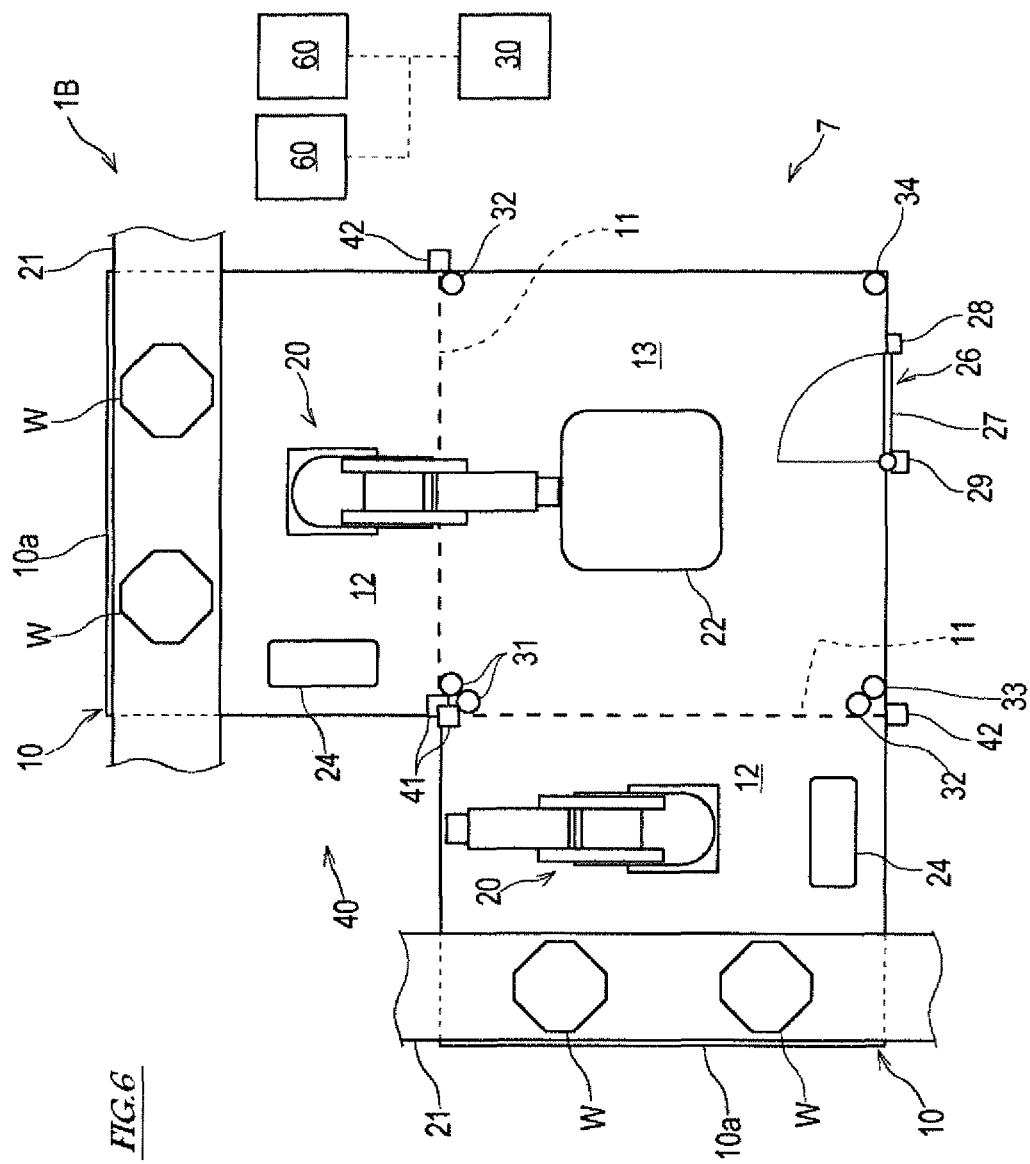
FIG. 6 is a plan view illustrating a schematic structure of a robot system according to Modification 2.

Moreover, in the embodiment described above, although one interference area 13 is defined per robot 20, one interference area 13 may be defined to the plurality of (here, two) robots 20 similar to a robot system 1B according to Modification 2 illustrated in FIG. 6, for example. In the example illustrated in FIG. 6, two robot areas 12 are defined per interference area 13, the robot indicating lamps 31 and 32 are provided to each of the boundaries 11 between the robot area 12 and the interference area 13, and the gate indicating lamps 33 and 34 are provided on both sides of the gate 26. In addition, each of the robot control devices 60 of the plurality of robots 20 is connected with one control device 30, and the control device 30 is configured to control the robot indicating lamps 31 and 32, the gate indicating lamps 33 and 34, and the lock device 28 corresponding to the operating situations of the plurality of robots 20.

FIG. 7 is a table illustrating operation of the access control system 7 to the interference area 13 which is applied to a robot system 1B in which one interference area 13 is defined to the plurality of robots 20 as illustrated in FIG. 6. As illustrated in FIG. 7, for example, when all the robots 20 are stopped (i.e., when it is in the state where the robot 20 is impossible to operate, such as when the motor power source of the robot 20 is off), the control device 30 of the access control system 7 turns on the blue light-emitting parts of all the indicating lamps 31-34 (i.e., indicates "permitted") and causes the lock device 28 to unlock the door 27 while the robots 20 are stopped. Moreover, for example, when at least one robot 20 is executing the operating program including the work in the interference area 13, the control device 30 of the access control system 7 turns on the red light-emitting parts of all the indicating lamps 31-34 (i.e., indicates "prohibited") and causes the lock device 28 to lock the door 27. Moreover, for example, while all the robots 20 are executing the operating program which does not include the work in the interference area 13, the control device 30 of the access control system 7 causes the red light-emitting parts of the robot indicating lamps 31 and 32 to blink (i.e., indicates "nudging"), turns on the blue light-emitting parts of the gate indicating lamps 33 and 34 (i.e., indicates "permitted"), and causes the lock device 28 to unlock the door 27.

It is apparent for a person skilled in the art from the above description that many improvements and other embodiments of the present disclosure are possible. Therefore, the above description is to be interpreted only as illustration, and it is provided in order to teach a person skilled in the art the best mode which implements the present disclosure. Details of the structures and/or the functions can substantially be changed without departing from the spirit of the present disclosure.

DESCRIPTION OF REFERENCE CHARACTERS 1, 1A, 1B: Robot System
7: Access Control System
10: System Area
11: Boundary
12: Robot Area
13: Interference Area
20: Robot
21: Conveyor
22: Work Bench
24: Tool Table
26: Gate
27: Door (Opening-And-Closing Member)
28: Lock Device
29: Gate Sensor
30: Control Device
31-34: Indicating Lamp
40: Passage Detection Sensor
60: Robot Control Device

What is claimed is:

1. An access control system configured to manage access of a worker to an interference area that is a works ace that the worker and a robot share, comprising:
  a plurality of indicating lamps defining a boundary between the interference area and another area;
  an opening-and-closing member configured to open and close a gate of the interference area;
  a lock device configured to lock and unlock the opening-and-closing, member; and
  a control device configured to control the plurality of indicating lamps and the lock device corresponding to operation of the robot, wherein the plurality of indicating lamps include at least one robot indicating lamp configured to define at least part of a boundary between a robot area that is a workspace where the robot works exclusively, and the interference area, and at least one gate indicating lamp configured to define at least part of a boundary between the interference area and areas other than the robot area, the at least part of the boundary including the gate, and
  wherein, when the robot is executing an operating program that does not include a work in the interference area, the control device controls the plurality of indicating lamps and the lock device to cause the robot indicating lamp to indicate "nudging," cause the gate indicating lamp to indicate "permitted," and cause the lock device to unlock the opening-and-closing member.

2. The access control system of claim 1, wherein, when the robot is stopped, the control device controls the plurality of indicating lamps and the lock device to cause the plurality of indicating lamps to indicate "permitted" and cause the lock device to unlock the opening-and-closing member.

3. The access control system of claim 1, further comprising a gate sensor configured to detect opening and closing of the gate, and
  wherein the control device detects that the worker exists in the interference area based on an open of the gate detected by the gate sensor.

4. The access control system of claim 1, further comprising a passage detection sensor configured to detect an object passing through the boundary between the robot area that is a workspace where the robot works exclusively, and the interference area, and wherein, while the worker exists in the interference area, the control device transmits a stop signal to the robot when the object passing through the boundary between the robot area and the interference area is detected by the passage detection sensor.

5. An access control system configured to manage access of a worker to an interference area that is a workspace that the worker and a robot share, comprising:

a plurality of indicating lamps defining a boundary between the interference area and another area;

an opening-and-closing member configured to open and close a gate of the interference area;

a lock device configured to lock and opening-and-closing member; and a control device configured to control the plurality of indicating lamps and the lock device corresponding to operation of the robot, wherein, when the robot is executing an operating program that includes a work in the interference area, the control device controls the plurality of indicating lamps and the lock device to cause the plurality of indicating lamps to indicate "prohibited" and cause the lock device to lock the opening-and-closing member.

6. The access control system of claim 5, wherein, when the robot is stopped, the control device controls the plurality of indicating lamps and the lock device to cause the plurality of indicating lamps to indicate "permitted" and cause the lock device to unlock the opening-and-closing member.

7. The access control system of claim 5, further comprising a gate sensor configured to detect opening and closing of the gate, and wherein the control device detects that the worker exists in the interference area based on an open of the gate detected by the gate sensor.

8. The access control system of claim 5, further comprising a passage detection sensor configured to detect an object passing through the boundary between the robot area that is a workspace where the robot works exclusively, and the interference area, and wherein, while the worker exists in the interference area, the control device transmits a stop signal to the robot when the object passing through the boundary between the robot area and the interference area is detected by the passage detection sensor.

\* \* \* \* \*